(12) United States Patent
Prunnbauer et al.

(10) Patent No.: US 9,732,704 B2
(45) Date of Patent: Aug. 15, 2017

(54) GAS ENGINE ASSEMBLY

(71) Applicant: MTU Friedrichshafen GmbH, Friedrichshafen (DE)

(72) Inventors: Jan Prunnbauer, Lindau (DE); Jörg Matthies, Salem (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 140 days.

(21) Appl. No.: 14/663,619

(22) Filed: Mar. 20, 2015

(65) Prior Publication Data

US 2015/0267647 A1 Sep. 24, 2015

(30) Foreign Application Priority Data

Mar. 20, 2014 (DE) ........................ 10 2014 004 013

(51) Int. Cl.
*F02M 21/02* (2006.01)
*F02D 19/02* (2006.01)
*F02D 41/00* (2006.01)
*F02N 19/00* (2010.01)

(52) U.S. Cl.
CPC ....... *F02M 21/0227* (2013.01); *F02D 19/025* (2013.01); *F02D 41/0027* (2013.01); *F02M 21/0245* (2013.01); *F02M 21/0293* (2013.01); *F02N 19/00* (2013.01); *Y02T 10/32* (2013.01)

(58) Field of Classification Search
CPC ........... F02M 21/0227; F02M 21/0245; F02M 21/0293; F02N 19/00; F02D 41/0027; F02D 19/025; Y02T 10/32
See application file for complete search history.

(56) References Cited

U.S. PATENT DOCUMENTS

| 7,019,626 | B1 * | 3/2006 | Funk | F02D 19/0647 123/205 |
| 2012/0240875 | A1 * | 9/2012 | Tan | F02D 19/0684 123/3 |
| 2015/0344145 | A1 * | 12/2015 | Epstein | B64D 37/30 244/135 C |
| 2015/0377159 | A1 * | 12/2015 | Fisher | F02D 41/0027 123/525 |

FOREIGN PATENT DOCUMENTS

| EP | 2706214 A1 | 3/2014 |
| WO | 8401339 A1 | 4/1984 |

* cited by examiner

*Primary Examiner* — Joseph Dallo
(74) *Attorney, Agent, or Firm* — Lucas & Mercanti, LLP; Klaus P. Stoffel

(57) ABSTRACT

Gas engine arrangement having a gas engine, a gas rail, via which a first gas in the form of fuel gas can be supplied to at least one gas metering device of the gas engine, and a gas control section, which is designed to supply fuel gas to the gas rail via a supply path on the outflow side. A purge line is passed into the gas rail. The gas engine arrangement is designed to selectively supply fuel gas or a second gas to the purge line, and the gas engine arrangement is designed to displace gas from the gas rail and to discharge it via the supply path when the fuel gas or second gas is supplied to the purge line.

18 Claims, 3 Drawing Sheets

PRIOR ART

GAS ENGINE ASSEMBLY

CROSS-REFERENCE TO RELATED APPLICATIONS

The present application claims priority of DE 10 2014 004 013.5, filed Mar. 20, 2014, the priority of this application is hereby claimed and this application is incorporated herein by reference.

BACKGROUND OF THE INVENTION

The present invention relates to a gas engine arrangement having a gas engine and a gas rail.

Gas engines, especially those which are used for mobile applications, e.g. in operating environments such as ships, commercial vehicles and the like, are subject to the requirement, as regards emergency stop situations, of adopting a safe operating state as they shut down. In general, this necessitates purging the gas rail and feeding it with inert gas.

FIG. 1 shows solutions in accordance with the prior art, in which, as can be seen, a high outlay is incurred for such purging inasmuch as it is often necessary in this case to pierce the double wall 7a' surrounding and protecting the fuel system 7' of the gas engine 3' and the gas rail 9' thereof in several places and, in association therewith, a multiplicity of valves also has to be installed in a disadvantageously expensive way in order to meet the requirements on the intended purging functionality.

In a first solution from the prior art in accordance with FIG. 1 (solid inert gas arrows), the inert gas is introduced (first valve) into an inflow path of the gas rail 9' and, if required, discharged (second valve) from the rail 9' through the double wall 7a', which is pierced in this case. This is obviously associated with a high outlay on construction, especially in respect of the piercing and sealing of the double wall 7a' (particularly also for the passage of control lines which is necessary in this case).

In a second variant in accordance with the prior art, as shown in FIG. 1 (inert gas arrows in dashed lines), the inert gas is introduced (first valve) directly at the gas rail 9' through the double wall 7a', which is pierced for this purpose, and is then released (second valve) via the gas control section 15'. In this solution too, the abovementioned disadvantages occur in the same way.

SUMMARY OF THE INVENTION

Taking this as a starting point, it is the underlying object of the present invention to propose a gas engine arrangement which is associated with reduced outlay on construction or manufacture for fuel gas purging combined with advantageously robust design and high stability, while reliable engine starting is also ensured as well.

According to the invention, a proposal is made for a gas engine arrangement having a gas engine which can preferably be operated with a fuel gas, e.g. in the form of natural gas or biogas or even synthetic gas or special gas, for example. In the context of the invention, a gas engine of this kind is preferably a large engine which, in particular, has a plurality of cylinders, e.g. 8 to 20 cylinders. The gas engine arrangement is preferably used in mobile environments, e.g. on motor vehicles in the form of ships or commercial vehicles, for example. In addition, however, stationary applications in plants for producing electrical energy, especially in plants with combined heat and power (e.g. small-scale cogeneration units) or combined heat, power and refrigeration, in industrial applications etc., are also conceivable. The invention can be used both with applied-ignition and with self-ignition gas engines and with those which provide a combination of both types of ignition.

The gas engine arrangement proposed comprises a gas rail (gas manifold bar or gas manifold pressure reservoir), via which a first gas in the form of fuel gas, in particular subject to low pressure, can be supplied or fed to at least one gas metering device of the gas engine. In general terms, a gas metering device can be embodied as a gas injection valve for example, e.g. as a solenoid valve, in particular for intake manifold injection for example. In general terms, a gas metering device is provided in the context of the present invention in order to form an ignitable mixture in an associated combustion chamber of the gas engine. A respective gas metering device can preferably be supplied with or receive a flow via a branch line on the gas rail.

The gas engine arrangement furthermore has a gas control section, which is designed to supply fuel gas to the gas rail via a supply path on the outflow side—in relation to the gas control section. Preferred embodiments here can provide for the supply path to be implemented by means of a hose or a hose connection or, alternatively, by means of a tube or tube section for example, in general terms in the form of a line for example.

In a manner known per se, the gas control section can have a gas filter, shutoff valves and a pressure regulating device for example (formed by means of a pressure reducer for example), and can furthermore have a leak testing device for example. On the inflow side, the gas control section can receive a flow via a fuel gas inlet, particularly in mobile applications starting from a fuel gas store, e.g. a pressurized tank.

It is characteristic of the gas engine arrangement according to the invention that it has a purge line, which is passed into the gas rail, that is to say, in particular, into the interior of the gas rail, wherein the gas engine arrangement is furthermore designed to selectively or optionally supply fuel gas or a second gas, in particular inert gas, to the purge line. According to the invention, the gas engine arrangement is furthermore also designed here to displace gas (i.e. fuel gas or second gas, according to the circumstances) from the gas rail and to discharge it via the supply path (i.e. in the reverse direction or toward the gas control section) when or as the fuel gas or second gas is supplied to the purge line. Preferably, it is possible by means of the invention to provide displacement of gas from the gas rail in such a way that the supply of one gas, i.e. the first or second gas, to the purge line is stopped as soon as the other, i.e. the second or first gas, has been displaced completely from the gas rail (and also from the supply path) (and has been discharged via the supply path, preferably toward the gas control section).

Via the purge line passed into the gas rail (which allows reliable purging, even in potential dead zones of the rail, by virtue of its arrangement in the gas rail), the gas engine arrangement designed in this way on the one hand enables a second gas to be introduced into the gas rail in a simple way that is advantageously inexpensive in terms of construction, displacing the fuel gas from the gas rail at the same time. Secondly, it is also possible by means of the proposed solution to displace the fuel gas in the intended manner from the supply path connected to the rail, preferably furthermore to discharge it via the gas control section for example and, in particular, to release it from the latter (e.g. to atmosphere, e.g. via a ship's funnel, or alternatively into a tank, for example). It is thus made possible in an advantageously simple way for the gas engine arrangement to adopt a safe operating state rapidly as the gas engine is shut down, that is to say as the gas engine, together with the inlet, is purged via the purge line, during which process the fuel gas is displaced from the gas rail by means of the second gas, in particular in the case of an emergency off or emergency stop situation.

In this case, particularly preferred embodiments of the gas engine arrangement envisage that the purge line branches into the supply path, that is to say, in particular, is passed into the rail or the interior thereof between the gas control section (on the outflow side thereof) and the rail (on the inflow side thereof) or via the supply path (e.g. from the inward-leading branch point). There is a preference here for solutions in which the supply path is embodied with just a single surrounding wall and/or is embodied with a single surrounding wall at the location of an inward-leading branch of the purge line. This enables the attachment of the purge line to be implemented in an extremely inexpensive way in terms of construction.

Further preferred embodiments envisage that the gas engine arrangement is designed furthermore—as already mentioned above—to release, via the gas control section gas, (first or second gas) displaced from the gas rail and discharged via the supply path, preferably to release it into the environment or to atmosphere for example. For this purpose, the gas control section can have an outflow device, in particular one formed by means of a blowoff valve.

The second gas (in particular nitrogen or $N_2$ or alternatively, for example, $CO_2$ or inert exhaust gas) can preferably be supplied, in particular under pressure, to the purge line, preferably from a pressurized gas store. A gas store of this kind can be provided, for example, by means of one or more pressurized gas cylinders, and can also be formed, for example, by means of a collecting container into which second gas, e.g. second gas separated from the ambient air, is introduced (in particular under pressure).

There is, moreover, provision within the scope of the invention for the gas engine arrangement to have a valve device, in particular in the form of a single valve, by means of which (and respective supply lines, connected thereto, for fuel gas or second gas (coming from the abovementioned store, for example)) the first and, alternatively, second gas can be supplied selectively to the purge line (the inlet thereof on the inflow side). A valve device of this kind can be formed by a ball valve, for example, more generally by means of a 3/3-way valve, for example.

The valve device is preferably capable of adopting three (valve) positions, wherein the gas engine arrangement is furthermore preferably designed to supply fuel gas to the purge line in a first position of the valve device, to supply the second gas or inert gas to the purge line in a second position of the valve device and wherein a third position of the valve device corresponds to a blocking position (in which both the fuel gas and the supply of second or inert gas is blocked and in which there is no flow to the purge line on the inlet side). This solution allows an advantageously inexpensive and robust embodiment of the gas engine arrangement for the intended purging.

Particularly simple purging of the gas rail with the second gas or inert gas can be accomplished with a gas engine arrangement according to the invention in which the gas control section can be shut off by means of a shutoff device on the inflow side (the shutoff device being, for example and for preference, an (inlet-side) main shutoff device (main guard valve) of the gas control section) and wherein the gas engine arrangement is furthermore designed initially to switch the shutoff device into the blocking position (and preferably furthermore to open the outflow device of the gas control section (thus ensuring that the gas rail together with the supply path is unpressurized))—in particular in the course of a shutdown. The gas engine arrangement can then switch the valve device to the second gas or into the second position for purging, thus enabling the second gas (from the compressed gas store, for example) to be supplied to the purge line via the valve device (and via the supply line) (with purging being enabled, in particular with an advantageously low pressure).

In another preferred embodiment of the gas engine arrangement, in which the second gas is likewise also once again displaced from the gas rail by means of fuel gas in an advantageously inexpensive way (in particular for restarting the gas engine) and in which, as described above, the gas control section can be shut off on the inflow side by means of a shutoff device, it is envisaged, as another preferred option, that a fuel gas branch (which, in particular, forms the fuel gas supply line connected to the valve device) leading to the valve device branches off upstream of the shutoff device, that is to say, in particular, in such a way that fuel gas can be connected to the purge line at a supply pressure (source pressure). This advantageously makes a separate pressure generation (device) for applying pressure to the fuel gas for displacement or purging when the engine is stationary unnecessary. In order to displace the second gas, the gas engine arrangement is in this case preferably designed initially to switch the shutoff device into the blocking position and to supply the fuel gas to the purge line via the fuel gas branch and the valve device (in particular in the first valve position). In this case, outflow of the displaced gas via the gas control section and the outflow device (opened for this purpose) is preferably made possible once again.

By means of the gas engine arrangement designed in this way, it is thus possible in an advantageously simple way to accomplish refilling of the gas rail with fuel gas, thus ensuring reliable ignition or starting of the gas engine. After refilling has been accomplished, the valve device can then be switched into the blocking position (thus also subsequently avoiding outflow of fuel gas in the direction toward or from the purge line inlet), and the shutoff device can then be reopened. In preferred embodiments, the gas engine arrangement thus also has this functionality.

Provision is also preferably made, within the scope of the present invention, for the shutoff device to be shut off when deenergized and/or for the valve device to switch into the second position when deenergized and/or for the outflow device to open when deenergized, i.e. when the gas engine is shut down. Reliable automatic displacement of fuel gas out of the gas rail in the event of a power failure or of an emergency stop is thereby ensured. In particular, the gas engine arrangement is designed, in the case of an embodiment of this kind, to switch a communicating connection from the (pressurized) gas supply for the second gas via the purge line, the rail and the supply path (and preferably the gas control section and the outflow device) to the environment in the event of an interruption in the power supply and/or a shutdown (emergency stop), i.e. to do so automatically or when deenergized.

As a preferred option in general terms, the gas engine arrangement can have a gas sensor system for control of the gas supply (fuel gas or second gas) to the gas rail via the purge line or can be designed for timer control. Such a system can be connected to a higher-level control system, which initiates switching (over) of the valve device and/or of the shutoff device and/or of the outflow device in accordance with a corresponding signal from the sensor system or timer control (detected fuel gas, elapsed time).

The invention also proposes a method for implementation with a gas engine arrangement of the kind explained above, wherein, in order to adopt a safe engine state in the course of a shutdown, a fuel gas supply to the gas rail from the gas control section is interrupted in a first step, e.g. in particular by means of the shutoff device. At the same time (or in a separate step) the outflow device is preferably opened or the gas rail together with the supply path is depressurized.

In a second step, the second gas (inert gas) is then supplied to the purge line and fuel gas is displaced from the gas rail and discharged via the supply path (and preferably via the gas control section (in the reverse direction) and furthermore, in particular, via the outflow device thereof, to atmosphere). Particularly where there is a power supply, displacement can be detected or controlled by means of a gas sensor system or, for example, by timer control, as mentioned above. Provision is preferably made to end the displacement of the fuel gas as soon as the gas rail (and preferably also the supply path) has been (completely) filled with the second gas (and an inert gas store is not unnecessarily emptied).

A proposal is also made for a method for implementation with a gas engine of the kind explained above, wherein, in order to start the gas engine, fuel gas is supplied to the purge line (in particular via the fuel gas branch line), with the result that gas, in particular second gas (inert gas), is displaced from the gas rail (and discharged via the supply path (and preferably via the gas control section (in the reverse direction) and furthermore, in particular, via the opened outflow device thereof, to atmosphere)). Displacement or purging can be ended as soon as the gas rail (and preferably also the supply path) have been (completely) filled with the fuel gas.

After displacement of the gas by means of the fuel gas, fuel gas can then be supplied to the gas rail via the gas control section and the supply path (shutoff device open) in a second step. Provision is preferably made here for the fuel gas supply to the purge line to be ended and/or for the valve device to be switched into the blocking position after displacement of the gas from the gas rail. As mentioned above, refilling with fuel gas can once again be detected or controlled by means of a gas sensor system or, for example, by timer control.

Further features and advantages of the invention will become apparent from the following description of illustrative embodiments of the invention with reference to the figures of the drawings, which show details essential to the invention, and from the claims. The individual features can each be implemented independently or together in any desired combination in a variant of the invention.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

In the following description and the drawings, identical reference signs correspond to elements with the same or a comparable function.

Figure 1:
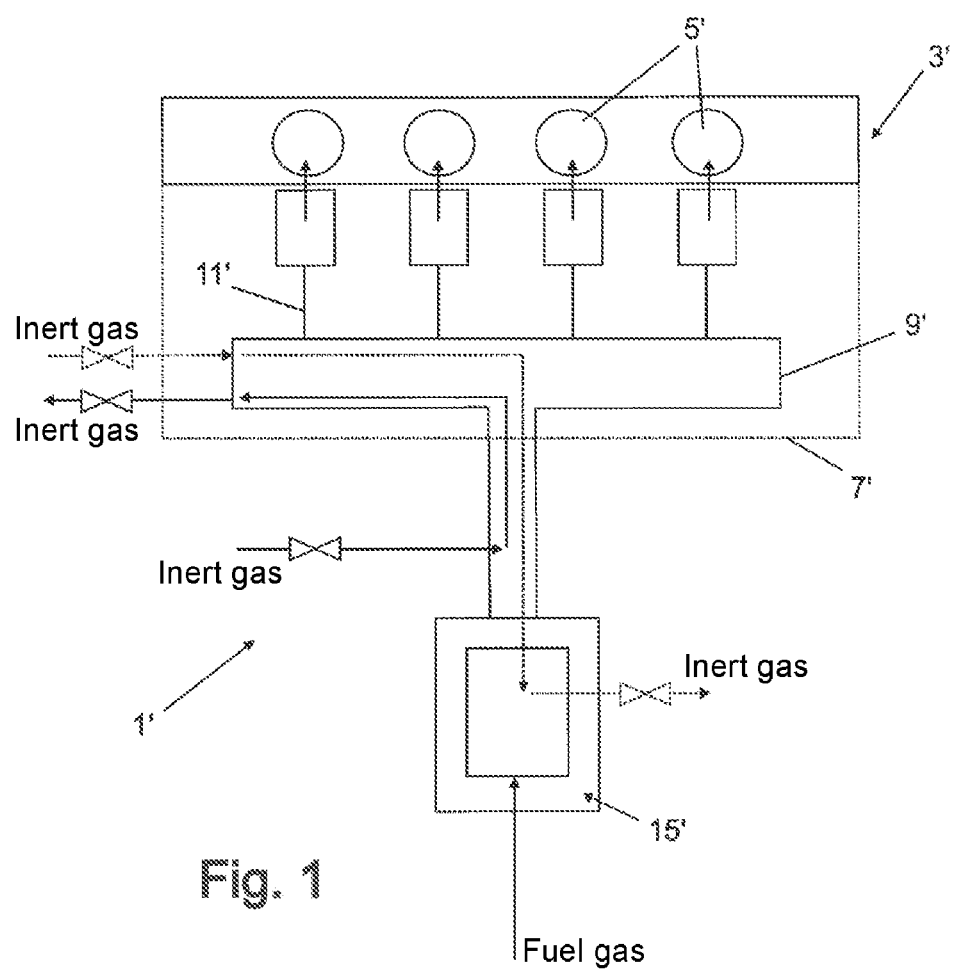
FIG. 1 shows a gas engine arrangement schematically and by way of example, said arrangement having a first and a second illustrated solution for purging in accordance with the prior art.
Figure 2:
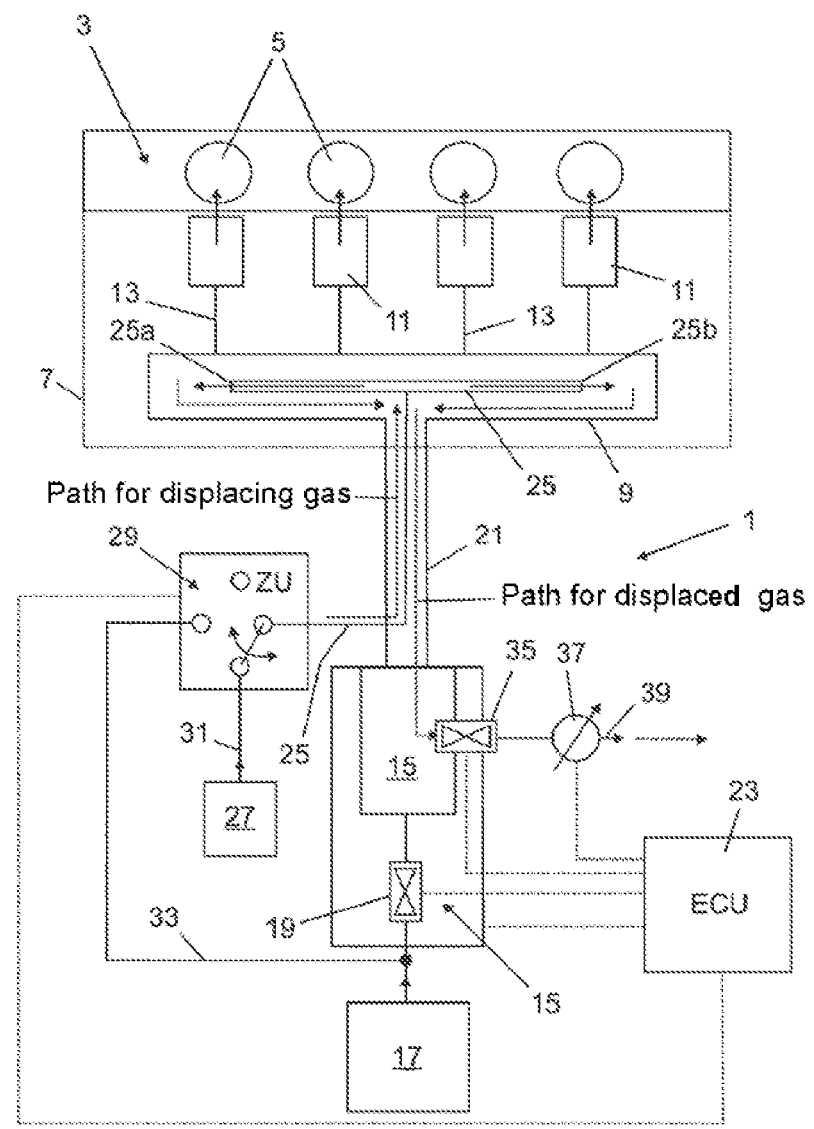
FIG. 2 shows a gas engine arrangement according to a possible embodiment of the invention schematically and by way of example.

FIG. 2 shows a gas engine arrangement 1 according to the invention by way of example, said arrangement having a gas engine 3, which is formed with a plurality of cylinders 5. As indicated in dashed lines, a fuel system part 7 of the gas engine 3 and a gas rail 9 thereof are encapsulated by a double wall here in order to meet the operating safety conditions applying to them.

A first gas or fuel gas (e.g. natural gas, biogas etc.) can be supplied to a gas metering device 11 for each cylinder 5 or to a plurality of gas metering devices 11 of the gas engine 3 via the gas rail 9 (gas manifold bar) of the gas engine 3. The gas metering devices 11 are provided as gas injection valves, in particular as solenoid valves for producing an ignitable mixture in a combustion chamber of each cylinder 5. Each of the gas metering devices 11 can receive a flow from the gas rail 9 via a branch line 13.

To supply the gas rail 9 with low-pressure fuel gas during engine operation, the gas engine arrangement 1 furthermore has a gas control section 15 designed for this purpose. On the inlet side, the gas control section 15 can receive a flow of pressurized fuel gas from a fuel gas supply 17, wherein the fuel gas can be taken from a source (e.g. when connected to a (natural) gas supply network) or a fuel gas store (e.g. when the gas engine 3 is used in a vehicle), for example.

Downstream of the fuel gas inlet, the gas control section 15 has a shutoff device 19 (master gas valve), to which further components of the gas control section 15 (not shown) are connected in the direction of gas flow, e.g. a filter, a pressure reducer, one or more pressure switches, valves, a monitoring device, compensator etc.

An outflow side of the gas control section 15 is furthermore connected for communication with the gas rail 9 via a supply path 21, which is preferably formed by means of a hose, more generally by means of a line, i.e. in such a way that fuel gas made available in a suitably prepared form by the gas control section 15 can be supplied or fed to the gas rail 9 via the supply path 21.

As illustrated in FIG. 2, the gas engine arrangement 1 furthermore has a control device 23 (ECU), which manages (dashed control lines) the gas control section 15, in particular also the shutoff device 19. The control device 23 can be provided as a system controller, and can also be implemented in an engine control unit, for example.

As FIG. 2 further illustrates, a purge line 25 is passed into the gas rail 9 (interior) in a manner according to the invention in the gas engine arrangement 1. In this case, the purge line 25 branches into the supply path 21 and is passed into the rail 9 via a segment of said supply path, wherein the purge line 25 branches (in a T shape) within the gas rail 9, for example, as illustrated (with the result that a plurality of outlet ends 25a, b) can advantageously be provided for effective purging, even in edge regions of the rail or potential dead zones). The purge line 25 can also preferably be provided as a hose, more generally as a line. For example, the purge line can also be formed by means of a tube in the rail 9 and a line or hose connected therewith for communication.

As also shown in FIG. 2, provision is made in the gas engine arrangement 1 for the purge line 25 to be connected to the supply path 21 in a segment thereof which is embodied with a single wall, thus advantageously eliminating the outlay for piercing the double wall of the fuel system part 7.

According to the invention, the gas engine arrangement 1 configured in this way is furthermore designed to supply fuel gas or a second gas selectively to the purge line 25. For this purpose, the gas engine arrangement 1 has a (pressurized) gas supply 27 for the second gas, which, in the case of the invention, is preferably a (pressurized) unreactive or inert gas, especially nitrogen. The gas supply 27 can be formed by means of one or more pressurized gas cylinders, for example, or, alternatively, can also be provided in the form of a gas network connection, for example.

For the selective supply of fuel gas and, alternatively, a second gas to the purge line 25, the gas engine arrangement 1 furthermore has a valve device 29, which is preferably provided as a single valve. Connected to the valve device 29, which can preferably be controlled or switched by means of the controller 23, see dashed control line in FIG. 2, there is, on the one hand, a supply line 31 from the gas supply 27 for the second gas and, on the other hand, a supply line or fuel gas branch 33, which branches off between the fuel gas supply 17 for the gas control section 15 and the shutoff device 19 thereof, i.e. upstream of the shutoff device 19.

Here, the valve device 29, embodied, for example, by means of a ball valve or, more generally, as a 3/3-way valve for example, is capable of adopting a first operating position, in which fuel gas can be supplied to the purge line 25 via the valve device 29. For this purpose, the fuel gas branch 33 is switched to the purge line 25 in the first operating position, i.e. is in communication therewith. As is apparent, the supply or source pressure of the fuel gas supply 17 is applied to the fuel gas branch 33 and to the purge line 25 in this case.

The valve device 29 is furthermore designed to supply the second gas to the purge line 25 in a second position. In the second operating position, the fuel gas branch 33 is thus shut off and the supply line 31 for the second gas is switched so as to be in fluid communication with the purge line 25. In this case, the supply or source pressure of the gas supply 27 for the second gas is applied to the purge line 25.

In a third position of the valve device 29, the valve device 29 shuts off, i.e. the purge line 25 is blocked at the inlet side, and the fuel gas branch 33 and the supply line 31 are furthermore each blocked at the outflow or valve (device) side.

According to the invention, the gas engine arrangement 1—configured in this way—is here furthermore also designed to supply fuel gas or second gas to the purge line 25 and to displace gas from the gas rail 9 and furthermore to discharge the displaced gas via the supply path 21 by supplying or feeding the fuel gas or second gas to the purge line 25.

The gas discharged via the supply path 21, i.e. gas discharged toward the gas control section 15, can then preferably be released via the gas control section 15, which is designed in a suitable way for this purpose, in particular to the environment, for which purpose the gas control section 15 preferably has an outflow device 35—in particular an outflow device which can be controlled by means of the control device 23—having a blowoff valve. In the context of the present invention, the gas displaced by means of the fuel gas or the second gas can be, in particular, fuel gas or a second gas, depending on the circumstances.

The gas engine arrangement 1 configured in this way allows rapid filling of the gas rail 9 with a second gas (inert gas), particularly in the case of an emergency stop, in an advantageously simple way, and therefore engine safety is promptly established, but, on the other hand, it also allows rapid (re-)filling of the gas rail 9 with fuel gas, in particular when starting up the gas engine 3, and therefore this too can be accomplished virtually without delay. Further details of this will be given below, in particular in combination with the method-related FIGS. 3 and 4.

Figure 3:
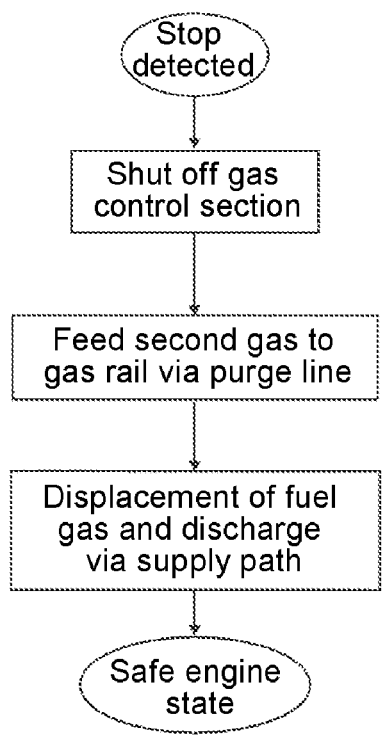
FIG. 3 shows a flow diagram of a method schematically and by way of example, which method can be carried out with the gas engine arrangement according to the invention in the context of a shutdown.

FIG. 3 illustrates the method which can be carried out with the gas engine arrangement 1, in particular in the event of an emergency stop, in which method fuel gas is purged or displaced from the gas rail 9 and the supply path 21 and replaced by the second gas.

After detection of the emergency stop situation, detected, for example, by the control device 23 (ECU), the fuel gas supply to the gas rail 9 from the gas control section is first of all interrupted, for which purpose the shutoff device 19 is preferably switched or switches into the blocking position. In conjunction therewith, the outflow device 35, in particular, opens, with the result that the low pressure level in the gas rail 9 and the supply path 21 falls to ambient pressure (or, for example, to the feed pressure in a tank device). In order to displace the remaining fuel gas from the gas rail 9 and the supply path 21, the second gas is then supplied to the purge line 25. For this purpose, the valve device 29 is switched from the blocking position thereof into the second position, with the result that, starting from the gas supply 27—with the pressure level thereof, which is above atmospheric pressure (or, alternatively, the tank pressure for example)—the second gas or inert gas is switched to the purge line 25. The fuel gas is thereby displaced from the gas rail 9 (and the supply path 21) and discharged via the supply path 21. The discharged gas is then released to the environment (or to a tank device, for example) via the gas control section 15, via the opened outflow device 35 thereof, e.g. via a ship's funnel.

In order to detect that the fuel gas has all been displaced in the intended manner, the gas engine arrangement 1 can preferably have at least one sensing device 37, which is coupled to the ECU 23, for example, and is preferably suitable for sensing fuel gas in the displaced gas. In this case, the sensing device 37 can be arranged in an outflow path 39 routed via the outflow device 35 at the gas control section 15, see FIG. 2.

If the sensing device 37 detects that fuel gas is no longer flowing out via the outflow path 39 in the context of fuel gas displacement, for example, it can send a corresponding signal to the controller 23, whereupon, if appropriate, said controller stops the filling of the gas rail 9 with the second gas and, in particular, switches the valve device 29 into the third position to achieve this (given the enabling of a power supply). As an alternative or in addition, it is also possible for timer control to be provided instead of the sensing device 37, for example, in which the valve device 29 is switched over after a predetermined time.

Figure 4:
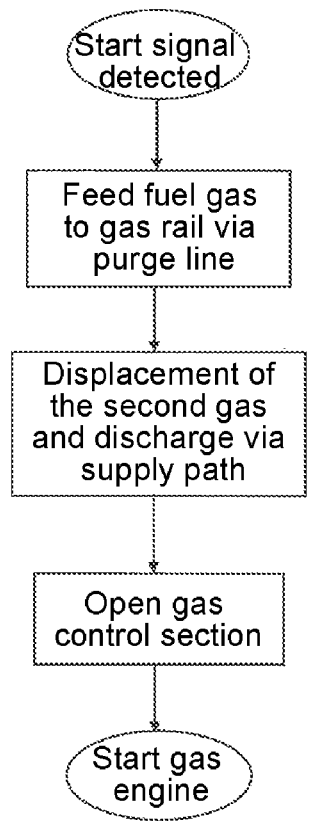
FIG. 4 shows a flow diagram of a method schematically and by way of example, which method can be carried out with the gas engine arrangement according to the invention in the context of a startup.

FIG. 4 then illustrates a method for implementation with the gas engine arrangement 1 in the context of (re)starting of the gas engine 3.

In order to displace the second gas from the gas rail 9 before restarting when a starting signal is detected, fuel gas is first of all supplied to the purge line 25. For this purpose, the valve device 29 is switched into the first position, while the shutoff device 19 is switched into the blocking position, in particular. Moreover, the outflow device 35, in particular, is opened, with the result that, on the one hand, the fuel gas—subject to the supply or source pressure—is carried or supplied to the gas rail 9 via the fuel gas branch 33, the valve device 29 and the purge line 25 and, on the other hand, the displaced (second) gas is discharged into the environment via the outflow device 35.

As soon as the second gas has been displaced, as intended —this once again being detectable by means of the sensing device 35, for example, or time-controlled, for example— fuel gas can then be supplied to the gas rail 9 via the gas control section 15 and the supply path 21 in a second step. In conjunction therewith, the fuel gas supply to the purge line 25 via the branch 33 is, on the one hand, ended by switching the valve device 21 into the blocking position and, on the other hand, the shutoff device 19 is opened (and the outflow device 35 shut off).

It may furthermore be observed that it is, in particular, proposed in the context of the gas engine arrangement 1 to design the shutoff device 19 in such a way that it blocks when deenergized. In this way, the continued flow of fuel gas into the gas control section 15 in the event of an emergency stop, especially one involving an interruption in the power supply, is prevented immediately in an effective manner. In the same way, it is also envisaged that the valve device 29 should be designed to switch into the second position when deenergized, ensuring that second gas automatically flows into the gas rail 9 via the purge line 25 (and the supply line 31) in the event of an emergency stop. The outflow device 35 is also preferably designed to open when deenergized, advantageously ensuring that the second gas flowing in via the purge line 25 is resisted only by atmospheric pressure and that the fuel gas can be displaced from the gas rail 9 without problems.

While specific embodiments of the invention have been shown and described in detail to illustrate the inventive principles, it will be understood that the invention may be embodied otherwise without departing from such principles.

We claim:

1. A gas engine arrangement, comprising:
   a gas engine
   a gas rail, via which a first gas is supplied to at least one gas metering device of the gas engine;
   a gas control section comprising a supply path to the gas rail, a master gas shutoff valve, and a blow off valve;
   a 3/3-way valve; and
   a purge line passed into the gas rail, wherein the 3/3-way valve is operative to selectively supply the first gas or a second gas to the purge line, and
   gas from the gas rail is redirected back through the supply path and discharged from the blow off valve when the the first gas or the second gas is supplied to the purge line.

2. The gas engine arrangement according to claim 1, wherein at least one of:
   the purge line branches into the supply path;
   the purge line is passed into the gas rail via the supply path; or
   the supply path is embodied with a single surrounding wall and/or is embodied with a single surrounding wall at a location of an inward-leading branch of the purge line.

3. The gas engine arrangement according to claim 1, wherein the gas engine arrangement is configured to discharge, via the gas control section, gas displaced from the gas rail and discharged via the supply path.

4. The gas engine arrangement according to claim 1, wherein the second gas is an inert gas.

5. The gas engine arrangement according to claim 1, further comprising a valve device by which the first or second gas is supplied selectively to the purge line.

6. The gas engine arrangement according to Claim 5, wherein the valve device has a first position in which fuel gas is supplied to the purge line, a second position in which the second gas is supplied to the purge line, and a third position corresponding to a blocking position.

7. The gas engine arrangement according to claim 6, further comprising a shutoff device on an inflow side of the gas control section; and
   a fuel gas branch leading to the valve device branches off upstream of the shutoff device, the shutoff device being switched into a blocking position for selective displacement of gas by fuel gas and to supply fuel gas to the purge line via the fuel as branch and the valve device.

8. The gas engine arrangement according to claim 7, further comprising a controller that switches the valve device into the blocking position after displacement of gas by the fuel gas and then opens the shutoff device.

9. The gas engine arrangement according to claim 7, further comprising a controller that switches the shutoff device into the blocking position and switches the valve device into the second position to supply the second gas to the purge line, and to supply the second gas to the purge line via the valve device.

10. The gas engine arrangement according to claim 1, wherein the gas control section has an outflow device, via which displaced gas discharged via the supply path is released or discharged into a tank.

11. The gas engine arrangement according to claim 10, wherein at least one of: the shutoff device is shut off when deenergized; the valve device switches into the second position when deenergized; or the outflow device opens when deenergized.

12. The gas engine arrangement according to claim 1, further comprising a controller that switches a communicating connection from a gas supply for the second gas via the purge line, the rail and the supply path in event of an interruption in a power supply or a shutdown.

13. The gas engine arrangement according to claim 1, further comprising a gas sensor system for control of the gas supply to the gas rail via the purge line.

14. A method for controlling a gas engine with a gas engine arrangement according to Claim 1, comprising the steps of
   interrupting a fuel gas supply to the gas rail from the gas control section in order to adopt a predetermined gas engine state in the course of an engine shutdown in a first step; and
   supplying the second gas to the purge line and displacing fuel gas from the gas rail and discharging the fuel gas via the supply path in a second step.

15. The method according to claim 14, including ending the second step as soon as the gas rail has been completely filled with the second gas.

16. A method for controlling a gas engine with a gas engine arrangement according to claim 1, comprising the steps of:

in order to start the gas engine, supplying fuel gas to the purge line via the fuel gas branch so that gas is displaced from the gas rail; and after displacement of the gas by means of the fuel gas, supplying fuel gas to the gas rail via the gas control section and the supply path.

17. The method according to claim 16, wherein after complete filling of the gas rail with fuel gas via the fuel gas branch, the fuel gas supply to the purge line via the fuel gas branch is ended.

18. The method according to claim 17, wherein the gas arrangement includes a valve device for selectively supplying the first gas or the second gas to the purge line, the method further including switching the valve device to a blocking position after complete filling of the gas rail with fuel gas via the fuel gas branch.

* * * * *